United States Patent [19]

Linscott

[11] Patent Number: 4,871,557
[45] Date of Patent: Oct. 3, 1989

[54] GRANOLA BAR WITH SUPPLEMENTAL DIETARY FIBER AND METHOD

[75] Inventor: Susan E. Linscott, Grand Rapids, Mich.

[73] Assignee: Amway Corporation, Ada, Mich.

[21] Appl. No.: 207,118

[22] Filed: Jun. 15, 1988

[51] Int. Cl.⁴ ............................................... A23L 1/10
[52] U.S. Cl. .................................... 426/93; 426/102; 426/103; 426/416; 426/457; 426/615; 426/618; 426/625; 426/640; 426/660
[58] Field of Search .................... 426/457, 625, 89, 93

[56] References Cited

U.S. PATENT DOCUMENTS

| | | | |
|---|---|---|---|
| 1,189,129 | 6/1916 | Kellogg | 426/457 |
| 2,437,150 | 3/1948 | Berg | 99/83 |
| 3,903,308 | 9/1975 | Ode | 426/93 |
| 4,038,427 | 7/1977 | Martin | 426/285 |
| 4,152,462 | 5/1979 | Hayward et al. | 426/72 |
| 4,156,020 | 5/1979 | Bohrmann et al. | 426/96 |
| 4,350,714 | 9/1982 | Duvall | 426/559 |
| 4,451,488 | 5/1984 | Cook et al. | 426/89 |
| 4,496,606 | 1/1985 | Michnowski | 426/658 |
| 4,543,262 | 9/1985 | Michnowski | 426/306 |
| 4,568,557 | 2/1986 | Becker et al. | 426/618 |
| 4,605,561 | 8/1986 | Lang | 426/93 |
| 4,619,831 | 10/1986 | Sharma | 426/93 |
| 4,673,578 | 6/1987 | Becker et al. | 426/93 |
| 4,689,238 | 8/1987 | Hitchner | 426/571 |
| 4,756,921 | 7/1988 | Calandro et al. | 426/560 |

FOREIGN PATENT DOCUMENTS 2837294 8/1978 Fed. Rep. of Germany.
1561190 2/1980 United Kingdom.

OTHER PUBLICATIONS

"Carbohydrate-Derived Sweetener has Benefits in Confections," *Food Engineering*, May 1986.
"Hystar HM-75 Product Information," Published by LONZA Inc., Fairlawn, N.J., by at least Aug. 1983.
"Hystar TPF Product Information," Published by LONZA Inc., Fairlawn, N.J., by at least Dec. 1985.
"Touch of Lycasin Creates Sugarless Success," *Candy Industry*, Apr. 1986.

*Primary Examiner*—Donald E. Czaja
*Assistant Examiner*—Evan Federman
*Attorney, Agent, or Firm*—Willian Brinks Olds Hofer Gilson & Lione

[57] ABSTRACT

The present invention is a granola bar with supplemental dietary fiber which is added to the granola bar in the form of compressed flakes, as well as the method of making such a granola bar. The method includes the steps of providing a mixture of granola ingredients selected from the group consisting of grains, fruits, and nuts. Supplemental dietary fiber is provided in the form of compressed flakes and mixed with the granola ingredients. Preferably, the compressed flakes of supplemental dietary fiber are made by combining with water and a binder material, such as rice flour, and then extruding. The extrudate is preferably dried and then ground to the desired particle size.

22 Claims, No Drawings

GRANOLA BAR WITH SUPPLEMENTAL DIETARY FIBER AND METHOD

BACKGROUND OF THE INVENTION

The present invention relates to the field of food products with high dietary fiber content. More particularly, the invention relates to the field of granola bars with high dietary fiber content.

The term "dietary fiber" has been defined as the indigenous components of plant materials in the diet which are resistant to digestion by enzymes produced by humans. Stated another way, dietary fiber is the sum of all polysaccharides and lignin that are not digested by the secretions of the human digestive tract. It is noted that, although the term "fiber" generally refers to filamentous, stringy materials, "dietary fiber" is often gelatinous or mucilaginous in character.

In recent years, the physiological benefits of adequate levels of dietary fiber in the diet have become more and more evident. Such benefits include the normalization of the bowel function and reduction of the occurrence of certain colonic diseases. Increased dietary fiber intake has been used in the treatment for diabetes, hypoglycemia, hypercholesterolemia, hypertriglyceridmedia. Dietary fiber has also been used as a control for metabolic rates to help prevent obesity.

In view of these benefits, health authorities have recommended a daily consumption of 20-35 grams of dietary fiber. Survey results have shown, however, that the average American consumes only 11.1 to 13.3 g of dietary fiber a day. It has been further recommended that the dietary fiber which is ingested should comprise about 70 percent insoluble fiber and about 30 percent soluble fiber. Common types of soluble dietary fiber include gum arabic, gum ghatti, guar gum, psyllium, carrageenans, xanthan, tragacanth, karaya, locust bean gum, agar, and alginates.

Various food products, such as breads and breakfast cereals, have been modified in order to include a greater dietary fiber content. In addition, consumers have looked to snack and convenience foods to provide increased fiber in their diet.

Granola bars have enjoyed a reputation as a healthy snack with a high fiber content. Unfortunately however, analysis of granola bars currently available in the market has shown that the fiber content is typically less than 5 percent by weight of the granola bar. Thus the typical 28 g. granola bar provides less than about 1 g. of fiber.

One factor working against the inclusion of a high level of dietary fiber in a granola bar is that adding too much supplemental dietary fiber to the granola bar formulation can have a negative impact on the texture and mouthfeel of the granola bar. For example, many of the common sources of dietary fiber are available only in a powdered form. It has been found that adding too much dry, powdered material to a granola bar formulation can result in a granola bar that has a dry and powdery mouthfeel. In other words, the addition of powdered supplemental dietary fiber interferes with the natural texture and mouthfeel otherwise associated with the granola ingredients such as rolled oats, chopped nuts, crisped rice, coconut, and the like. Such a texture and mouthfeel problem is particularly disadvantageous in view of the trend toward soft and chewy granola bars.

SUMMARY OF THE INVENTION

Briefly stated, the present invention is a granola bar with supplemental dietary fiber which is added to the granola bar in the form of compressed flakes, as well as the method of making such a granola bar. The method includes the steps of providing a mixture of granola ingredients selected from the group consisting of grains, fruits, and nuts. Supplemental dietary fiber is provided in the form of compressed flakes and mixed with the granola ingredients.

In accordance with a preferred embodiment of the invention, the compressed flakes of supplemental dietary fiber are made by mixing supplemental dietary fiber with a binder and water. In particular, 2 parts apple fiber, 1 part corn bran, and 1 part rice flour are mixed and moistened with water and then heated, extruded, dried, and particle sized. Preferably, the mean particle size of these flakes is about 20 U.S. mesh. These fiber/corn bran flakes are added at a level of about 9 percent to a granola bar mixture which includes a mixture of granola ingredients constituting about 34 percent of the granola bar. Preferably, the granola ingredients comprise rolled oats, crisped rice, chopped almonds, and coconut flakes. In this embodiment, other supplemental dietary fiber is added to about 17 percent of the granola bar and comprises soy fiber, apple pectin, gum arabic, gum ghatti, and guar gum. The preferred embodiment includes a humectant system comprising hydrogenated glucose syrup at a level of about 20 percent of the granola bar and glycerine at a level of about 5 percent of the granola bar. This preferred embodiment also includes about 7 percent fructose. This preferred embodiment further includes about 2 percent oil, about 5 percent brown sugar, and about 1 percent of natural flavors and lecithin.

It is noted that the term "supplemental dietary fiber," as used in this specification and the appended claims, is intended to refer to dietary fiber which is added to the granola bar apart from the fiber which is naturally included as part of the typical granola ingredients.

It is also noted that, unless otherwise state, all percentages given in this specification and the appended claims refer to percentages by weight. In the same regard, it is noted that although the preferred granola bar of the present invention includes a coating of chocolate or the like, unless otherwise noted, the weights of the granola bar ingredients are determined before the coating is added.

The present invention is advantageous in that it provides a granola bar which has a high dietary fiber content and a satisfactory texture and mouthfeel. In particular, the invention provides a method of incorporating higher levels of supplemental dietary fiber into a granola bar formulation with minimal interference with the natural texture and mouthfeel of the granola bar.

These and other objects, advantages, and features of the present invention will be better understood upon review of the following detailed description of the preferred embodiments.

DETAILED DESCRIPTION OF THE PREFERRED EMBODIMENTS

The preferred embodiment of the present invention is identical to that described as the most preferred embodiment in the co-pending U.S. patent application Ser. No. 207,368 filed on the same day by the same inventor and assigned to the same assignee. The co-pending application is directed to a chewy high-fiber granola bar with a particular humectant system. The entire disclosure of this co-pending application is incorporated herein by reference.

In accordance with the invention which is the subject of the present invention, supplemental dietary fiber is used in the form of compressed flakes. Preferably, the compressed flakes of supplemental dietary fiber are made by an extrusion process. Alternatively, other techniques such as wet mixing combined with a drying and a rolling, pressing, chopping and/or a grinding step can be used.

The supplemental dietary fiber used in the compressed flakes can be of various types and is preferably a mixture of various types of dietary fiber. More preferably, the supplemental dietary fiber is a mixture of soluble and insoluble dietary fiber. Most preferably, the dietary fiber of the granola bar will comprise about 70 percent insoluble dietary fiber and about 30 percent soluble fiber.

Although sources of supplemental dietary fiber can contribute both soluble and insoluble fiber, sources generally known to contribute insoluble fiber include but are not limited to soy fiber, apple fiber, corn bran, wheat bran, oat bran, barley bran, rye bran, triticale bran, cellulose, pea fiber, sugar beet fiber, and peanut fiber. Sources generally known to contribute soluble fiber include but are not limited to gum arabic, gum ghatti, guar gum, pectins, psyllium, carrageenans, xanthan, tragacanth, karaya, locust bean gum, agar, and alginates.

Of these sources of supplemental dietary fiber, soy fiber, apple fiber, corn bran, cellulose and its derivative, oat bran, sugar beet fiber, peak fiber, guar gum, gum arabic, gum ghatti, locust bean gum, karaya, xanthan, and apple pectin are preferred. A mixture of apple fiber and corn bran is most preferred. A suitable apple fiber can be obtained from Tastee Apple Inc. under the designation "Apple Fiber". A suitable corn bran can be obtained from A.E. Staley Co. under the designation "Bestbran 90, Refined Corn Bran, G-Ultrafine".

Alternatively, other types of supplemental fiber can be incorporated into the compressed flakes of the present invention. In addition, other ingredients can also be added to the compressed flakes. For example, a sweetener, flavorant, or colorant can be added to the compressed flakes to add to their function within the granola bar.

Preferably, the supplemental dietary fiber is mixed with a binder before being extruded. Preferable binders include rice flour, wheat flour, oat flour, corn flour, rye flour, potato flour, and mixtures thereof. Rice flour, such as that sold by Riviana under the designation "Rice Flour RL-100, long grain," is most preferred.

Preferably, the compressed flakes include between about 40 and about 60 percent apple fiber, between about 20 and about 30 percent corn bran, and between about 20 and about 30 percent rice flour. Most preferably, the flakes include about 50 percent apple fiber, about 25 percent corn bran, and about 25 percent rice flour.

The apple fiber, corn bran, and rice flour are preferably mixed together with an amount of water sufficient to bind the mixture together and sufficient to facilitate extrusion of the mixture. Typically, the water is added to between about 10 and about 30 percent of the mixture. Most preferably, the damp mixture includes about 26 percent water just prior to extrusion.

The extrusion step can be performed by conventional techniques in conventional extrusion apparatus. Preferably, the damp mixture is heated to a temperature between about 300° and about 330° F., most preferably about 315° F. during the extrusion process. Preferably, the damp mixture is extruded at a pressure of between about 100 p.s.i. and about 900 p.s.i. Preferably, the die through which the mix is extruded includes one round hole with a diameter of about 0.5 inches.

Preferably, the extrudate is particle sized by being ground before being dried. This can be accomplished by using a conventional Wenger Shredder. After grinding, the flake are dried in an oven at 270° F. for about 20 minutes. Preferably, the dried particles will have a moisture content of about 7 percent.

Alternatively, the extrudate is first dried and then particle sized, e.g. by grinding, rolling, or other conventional techniques.

The particle size of the compressed flakes is an important feature in the method of the present invention. Preferably, the compressed flakes will have a mean particle size of between about 100 and about 5 U.S. mesh. More preferably, the compressed flakes will have a mean particle size of between about 60 and about 10 U.S. mesh, and most preferably about 20 U.S. mesh. In particular, the particle size of the flakes made according to the most preferred embodiment ranges from 200 to 5 U.S. mesh with less than about 5 percent retained on a 10 U.S. mesh screen and less than about 7 percent passing through a 60 U.S. mesh screen.

While not wishing to be bound by any particular theory, it is currently believed that the particle size of the compressed flakes is related to the success of the present invention in incorporating supplemental dietary fiber into a granola bar with minimal interference with the texture and mouthfeel of the granola bar. In particular, it is believed that by aggregating the otherwise fine particles of supplemental dietary fiber into the larger compressed flakes, the supplemental dietary fiber is made more compatible, in a physical sense, with the other ingredients of the granola bar. In other words, the supplemental dietary fiber is put into a physical form which is more like that of the granola ingredients such as the rolled oats, chopped nuts, and the like. That is, the supplemental dietary fiber is put into a physical form which mimics, to some extent, the physical form of the granola ingredients. As a result, the supplemental dietary fiber added in this way is physically less distinguishable from the granola ingredients.

In light of the above, the preferred particle size of the compressed flakes can also be stated in relative terms. The ratio of the mean particle size of the compressed flakes to the mean particle size of the granola ingredients is preferably between about 1.0:1 and about 2:1. More preferably, the ratio is between about 0.5:1 and about 1:1.

Another reason the use of compressed flakes of supplemental fiber is believed to improve the texture and mouthfeel of the granola bar over that resulting from simply incorporating dry powdered supplemental fiber, is that the rate of hydration of the compressed flakes is lower than that of a powdered ingredient. Because of a lowered surface area, the compressed flakes do not absorb water as fast as the separate powders would. As a result, the compressed flakes do not contribute to the dry mouthfeel normally experienced with powders.

Another possible reason for the success of the preferred embodiment is the fact that the supplemental dietary fiber is combined with the binder material. In particular, it is believed that the supplemental dietary fiber may be more compatible within the granola bar because it it combined with a more compatible material, i.e, the binder material.

After the compressed flakes are appropriately particle sized and dried they are ready to be incorporated into the granola bar of the present invention. As stated above, the preferred embodiment of the present application is identical to that described in the co-pending application. According to this preferred embodiment, the ingredients of the granola bar formulation are generally divided between the liquid ingredients and the dry ingredients. Preferably, the liquid ingredients of the granola bar are combined in a syrup pre-blend. Most preferably, this syrup pre-blend includes the hydrogenated glucose syrup and glycerine of the humectant system, together with fructose, brown sugar, oil, lecithin, and flavors.

The preferred humectant system comprises hydrogenated glucose syrup and glycerine. Hydrogenated glucose syrups have also been referred to as hydrogenated starch hydrolysates or hydrogenated corn syrup (if made from corn syrup). Generally hydrogenated glucose syrups comprise a blend of sorbitol, maltitol, and longer chain polyhydric alcohols. The longer chain polyhydric alcohols are usually referred to by the degree of polymerization (DP). For example, "DP 3" refers to maltotriatol, i.e a polyhydric alcohol comprised of 3 glucose units.

The most preferred hydrogenated glucose syrup is that sold by LONZA, INC. under the designation "Hystar TPF 70 %." This particular hydrogenated glucose syrup comprises about 30 percent water, about 50 percent sorbitol, about 8 percent maltitol, about 3 percent DP 3 (maltotriatol), and about 8 percent DP 4 and higher.

The level of hydrogenated glucose syrup in the granola bar of the present invention is at least 2 percent of the granola bar. Preferably, the hydrogenated glucose syrup is present at between about 2 and about 45 percent. Levels above about 45 percent typically result in a granola bar that is too soggy. More preferably, the hydrogenated glucose syrup should be between about 4 and about 25 percent. In accordance with the most preferred embodiment, the above-described hydrogenated glucose syrup is present at about 20 percent.

The second component of the humectant system is glycerine. Most preferably the glycerine is 99.5% pure and is sold by the GLYCO CO. under the designation "glycon G-100." The level of glycerine in the granola bar is between about 2 and about 6 percent of the granola bar. Preferably, the glycerine is present at between about 3 and about 6 percent, more preferably between about 4 and about 6 percent. In accordance with the most preferred embodiment, the above-described glycerine is present at about 5 present.

The granola bar of the present invention preferably includes fructose as a sweetener/humectant. Although other sugars such as sucrose can be used, fructose is preferred because it is better than sucrose as a humectant in binding water within the bar. Fructose is also preferred because it does not require insulin for transport and is thus preferred in a diabetic diet. Also, fructose has a higher sweetness potential than sucrose.

According to the most preferred embodiment, the fructose is added in the form of granola fructose along with roughly the same amount of water to the syrup pre-blend. The syrup pre-blend is eventually boiled down to remove substantially all of this added water. Alternatively, the fructose can also be added in the form of a carbohydrate syrup, such has high fructose corn syrup.

When fructose is used in the granola bar of the invention, it is preferably added to between about 1 and about 12 percent of the granola bar. In this most preferred embodiment, the fructose is added to a level of about 17 percent of the syrup pre-blend and about 7 percent of the granola bar.

Preferably, brown sugar is also added to the syrup pre-blend in an amount between about 1 and about 10 percent of the granola bar. Most preferably, the grown sugar is added to about 12.5 percent of the syrup pre-blend and about 5.0 percent of the granola bar. A suitable brown sugar is that sold by C & H Sugar Co. under the designation "Golden C Medium Brown Sugar." Preferably, the syrup pre-blend is heated and stirred sufficiently to assure dissolution of the brown sugar before the syrup pre-blend is added to the dry ingredients.

The granola bar of the present invention also preferably includes between about 1 and about 10 percent of an edible oil. In the most preferred embodiment, a hydrogenated soybean/cottonseed oil is added to comprise about 5 percent of the syrup pre-blend and about 2 percent of the granola bar.

Preferably, flavors are also added to the syrup pre-blend. In this most preferred embodiment, natural vanilla flavor, coconut flavor, and natural butter flavor are added in a combined amount of about 2.5 percent of the syrup pre-blend and about 1.0 percent of the granola bar.

Lecithin is also preferably added to the syrup pre-blend in an amount between about 0.1 and about 1 percent of the syrup pre-blend to act as an emulsifier for the oil in the granola bar. Most preferably, the lecithin is added in an amount of about 0.25 percent of the syrup pre-blend and about 0.1 weight percent of the granola bar.

The most preferred method of combining the ingredients of the syrup pre-blend is as follows: The blending takes place in a bowl of a hobart mixer equipped with a steam jacket for heating the contents of the mixing bowl. With the mixer on the low speed, the hydrogenated glucose syrup, glycerine, granulated fructose, brown sugar, and water are added to the mixing brown which is heated to boiling until the mixture is boiled down to between about 80 and about 86 percent solids, most preferably about 83 percent solids. The mixture is then allowed to cool to 120° F. after which the oil is added and mixing is continued for about 5 minutes. The lecithin and vanilla and coconut flavors are added and mixing is continued for another 5 minutes. Finally, the butter flavor is added and the mixing is continued for another 5 minutes. At this point, the syrup pre-blend is ready to be mixed with the remainder of the ingredients of the granola bar.

The granola ingredients are selected from the group consisting of grains, nuts, and fruits, as well as mixtures thereof. Preferably, the granola ingredients will comprise a mixture of ingredients selected from the group consisting of toasted rolled oats, crisped rice, chopped nuts, coconut flakes, dried fruit, wheat flakes. Chocolate chips have also become popular in granola bars. Preferably, the granola ingredients comprises between about 30 and about 40 percent of the granola bar, most preferably about 35 percent.

In the most preferred embodiment, the mixture of granola ingredients comprises a mixture of toasted rolled oats, crisped rice, chopped almonds, unsweetened coconut flakes in the following amounts: toasted rolled oats at about 54.5 percent of the granola ingredients, about 30.5 percent of the dry ingredients, and about 18.3 percent of the granola bar; crisped rice at about 19.6 percent of the granola ingredients, about 11.0 percent of the dry ingredients, and about 6.6 percent of the granola bar; chopped almonds at about 14.3 percent of the granola ingredients, about 8.0 percent of the dry ingredients, and about 4.8 percent of the granola bar; and unsweetened coconut flakes at about 11.6 percent of the granola ingredients, about 6.5 percent of the dry ingredients, and about 3.9 percent of the granola bar.

Preferably, part of the total supplemental dietary fiber, namely the apple fiber/corn bran flakes described above and apple pectin extract, is mixed with the granola ingredients before the syrup pre-blend is added. Other supplemental dietary fiber is added after the syrup pre-blend and granola ingredients have been blended.

Preferably, supplemental dietary fiber, both untreated and in the form of compressed flakes, is added to the granola bar in an amount such that the total dietary fiber content of the granola bar is at least about 5 percent. Because the granola ingredients are likely to contribute some dietary fiber, the amount of fiber contributed by the supplementary dietary fiber will vary depending on the ingredients selected. In the most preferred embodiment, the granola ingredients contribute about 15 percent of the total dietary fiber and the supplemental dietary fiber contributes about 85 percent.

Preferably, the supplemental dietary fiber is added to the granola bar in an amount such that the total dietary fiber content of the granola bar is at least about 10 percent, more preferably, at least about 15 percent.

Preferably, the compressed flakes of supplemental dietary fiber comprise between about 0.5 and about 20 percent by weight of the granola bar, more preferably between about 6 and about 12 percent.

Various techniques are available for measuring the total dietary fiber content of food products. A suitable technique is an enzymatic gravimetric method designated by the Association of Official Analytical Chemists as #43.A14-43.A20. The entire granola bar can be analyzed by a method such as this. Alternatively, the total dietary fiber content of the granola bar can be calculated by determining the dietary fiber contents of the individual ingredient.

In the most preferred embodiment, the supplemental dietary fiber consists of soy fiber added at about 36.4 percent of the supplemental dietary fiber, about 16 percent of the dry ingredients, and about 9.6 percent of the granola bar; apple fiber/corn bran flakes (described in detail above) at about 33.0 percent of the supplemental dietary fiber, about 14.5 percent of the dry ingredients, and about 8.7 percent of the granola bar; gum arabic at about 9.1 percent of the supplemental dietary fiber, about 0.4 percent of the dry ingredients, and about 2.4 percent of the granola bar; gum ghatti at about 5.7 percent of the supplemental dietary fiber, about 2.5 percent of the dry ingredients, and about 1.5 percent of the granola bar; apple pectin extract at about 11.4 percent of the supplemental dietary fiber, about 5.0 percent of the dry ingredients, and about 3.0 percent of the granola bar; guar gum at about 4.5 percent of the supplemental dietary fiber, about 2.0 percent of the dry ingredients, and about 1.2 percent of the granola bar.

In the most preferred embodiment, the toasted rolled oats, apple pectin extract, apple fiber/corn bran flakes, crisped rice, unsweetened coconut flakes, and the chopped almonds are first mixed together and then added in the proper amount to the syrup pre-blend. Preferably, these ingredients are added to the syrup pre-blend one fourth at a time until completely mixed in.

The last ingredients added are the supplemental dietary fibers which are in the form of fine powders, i.e. the guar gum, gum ghatti, gum arabic, and soy fiber. These powders are first dry blended and then added to the mixing bowl containing the syrup pre-blend and the rest of the dry ingredients.

Preferably, the granola bar will constitute between about 35 and about 45 percent of the syrup pre-blend and between about 55 and about 65 percent of the dry ingredients. Most preferably, the granola bar will constitute about 40 percent of the syrup pre-blend and about 60 percent of the dry ingredients.

After mixing is complete, the mixture is transferred to a conventional granola bar forming line. The mixture is first formed into a slab with thickness of about 7/16". After cooling to about 60° F., the slab is slit into ribbons about 1.14 inches wide. The ribbons are then cut to a bar weight of about 28.0 g which is typically about 3.38 inches long.

In the most preferred embodiment, analysis of the granola bar reveals that the granola bar includes about 5 g. of dietary fiber which is about 17 percent of the total bar. The analysis used is an enzymatic gravimetric method designated by the Association of Official Analytical Chemists as #43.A14-43.A20. The granola bar made according to this most preferred embodiment possesses a remarkably soft and chewy texture.

Preferably, the granola bar has a coating, such as chocolate, applied to it. Alternatively, the bar is left uncoated or has yogurt, peanut butter, and other flavored coatings applied to it. Most preferably, conventional coating techniques are used to surround the granola bar with about 10 g. of chocolate. A suitable chocolate for coating is a milk chocolate sold by the AMBROSIA CHOCOLATE CO. under the designation "#S-5943."

EXAMPLES

The following examples are provided by ways of explanation and description and should not be seen as limiting the scope of the invention.

Two batches of compressed flakes of supplemental dietary fiber were made according to the most preferred embodiment described above, with the exception that the batches varied in particles size. To determine the particle size range of the flakes produced in each batch, a set of screens of increasing mesh were arranged vertically. 100 g. of the flakes were poured onto the top screen and the screen were vibrated with a sonic sifter. The screens were then removed and weighed to determine the weight percentage of compressed flakes retained on each screen. The following data was obtained:

| Mesh Size | Opening (in.) | Batch 1 | Batch 2 |
| --- | --- | --- | --- |
| | .250 | 0.0 | 0.6 |

-continued

| Mesh Size | Opening (in.) | Batch 1 | Batch 2 |
|---|---|---|---|
| 5 | .157 | 0.0 | 26.57 |
| 6 | .132 | 0.0 | 12.5 |
| 8 | .0937 | 1.0 | 42.6 |
| 10 | .0661 | 4.08 | 10.4 |
| 14 | .0469 | 23.61 | 3.8 |
| 20 | .0337 | 24.61 | 1.1 |
| pan |  | 46.7 | 2.5 |

Because such a high percentage of flakes from the first batch passed through to the pan, the contents of the pan from the first batch were then poured onto a second set of screens of increasing mesh numbers. The following data was obtained:

| Mesh Size | Opening (in.) | Batch 1 |
|---|---|---|
| 40 | .0165 | 28.55 |
| 60 | .0098 | 14.24 |
| 80 | .0070 | 3.91 |
| 100 | .0059 | 1.60 |
| 200 | .0029 | 1.13 |
| pan |  | 0.57 |

In the three examples, compressed flakes from the first bath were used in making 50 g. batches for granola bars. Each of the examples included 40 percent syrup pre-blend and 60 percent of the dry ingredients. The mixing was carried out as described above for the most preferred embodiment. In each example, the resultant mix was formed into granola bars of the size and weight described above.

Examples 1 through 3 were carried out to determine the effects of varying the amount of apple fiber/corn bran flakes within the granola bar. The formulation of the syrup pre-blend for the three examples was kept constant as follows:

|  | % of formula | % of pre-blend |
|---|---|---|
| Fructose | 6.9 | 17.3 |
| Hydrogenated Glucose Syrup (Hystar TPF-70) | 20.0 | 50.0 |
| Glycerine | 5.0 | 12.5 |
| Brown Sugar | 5.0 | 12.5 |
| Hydrogenated Oil | 2.0 | 5.0 |
| Flavors | 1.0 | 2.5 |
| Lecithin | .1 | .25 |
|  | 40.0% | 100.0% |

Example 1 was carried out in accordance with the most preferred embodiment. Example 2 included more crisped rice and less supplemental dietary fiber compressed flakes. The granola bars made in Example 2 thus had only about 4 g. of dietary fiber by analysis compared to 5 g. for the granola bars made in Example 1. Example 3 included less crisped rice and more supplemental dietary fiber compressed flakes, and thus had about 6 g. of dietary fiber by analysis. The formulations of the dry ingredients were as follows:

|  | Example 1 | | Example 2 | |
|---|---|---|---|---|
|  | % of formula | % of blend | % of formula | % of blend |
| Rolled Oats | 18.3 | 30.5 | 23.5 | 39.2 |
| Soy Fiber | 9.6 | 16.0 | 9.6 | 16.0 |
| Apple Fiber/Corn Bran Flakes | 8.7 | 14.5 | 0.6 | 1.0 |
| Crisped Rice | 6.6 | 11.0 | 9.5 | 15.8 |
| Almonds | 4.8 | 8.0 | 4.8 | 8.0 |
| Coconut | 3.9 | 6.5 | 3.9 | 6.5 |
| Apple Pectin Extract | 3.0 | 5.0 | 3.0 | 5.0 |
| Gum Arabic | 2.4 | 4.0 | 2.4 | 4.0 |
| Gum Ghatti | 1.5 | 2.5 | 1.5 | 2.5 |
| Guar Gum | 1.2 | 2.0 | 1.2 | 2.0 |
|  | 60.% | 100.0% | 60.0% | 40.0% |

| Example 3 | | |
|---|---|---|
|  | % of formula | % of blend |
| Rolled Oats | 12.4 | 20.7 |
| Soy Fiber | 9.6 | 16.0 |
| Apple Fiber/Corn Bran Flakes | 17.3 | 28.8 |
| Crisped Rice | 3.9 | 6.5 |
| Almonds | 4.8 | 8.0 |
| Coconut | 3.9 | 6.5 |
| Apple Pectin Extract | 3.0 | 5.0 |
| Gum Arabic | 2.4 | 4.0 |
| Gum Ghatti | 1.5 | 2.5 |
| Guar Gum | 1.2 | 2.0 |
|  | 60.% | 100.0% |

It was observed that the granola bar made in Example 2 was slightly softer and chewier than that of Examples 1 and 3. The granola bar made in Example 3 had the driest texture of the three. It is noted that the formulation for the dry ingredients in Example 1 yield about 17 percent dietary fiber per bar and that the ratio of insoluble fiber to soluble fiber is about 70 to 30.

I claim:

1. A granola bar with supplemental dietary fiber comprising:
   a mixture of granola ingredients selected from the group consisting of grains, fruits, and nuts;
   supplemental dietary fiber in the form of compressed flakes, wherein the compressed flakes of supplemental dietary fiber have a mean particle size between about 100 and about 5 U.S. mesh and comprise between about 5 and about 20 percent of the granola bar.

2. The granola bar of claim 1 wherein the compressed flakes of supplemental dietary fiber comprise at least one source of supplemental dietary fiber and at least one binder material.

3. The granola bar of claim 2 wherein the supplemental dietary fiber is selected from the group consisting of apple fiber, corn bran, soy fiber, pectin, guar gum, gum ghatti, and gum arabic, as well as mixtures thereof.

4. The granola bar of claim 2 wherein the binder material is selected from the group consisting of rice flour, wheat flour, oat flour, corn flour, rye flour and potato flour, as well as mixtures thereof.

5. The granola bar of claim 1 wherein the compressed flakes of supplemental dietary fiber have a mean particle size between about 60 and about 10 U.S. mesh.

6. The granola bar of claim 1 wherein the compressed flakes of supplemental dietary fiber have a mean particles size of about 20 U.S. mesh.

7. The granola bar of claim 1 wherein the ratio of the mean particle size of the compressed flakes of supplemental dietary fiber to the mean particle size of the granola ingredients is between about 0.1:1 and about 2:1.

8. The granola bar of claim 7 wherein the compressed flakes of supplemental dietary fiber comprise at least one supplemental dietary fiber and at least one binder material.

9. The granola bar of claim 7 wherein the supplemental dietary fiber is selected from the group consisting of apple fiber, corn bran, soy fiber, pectin, guar gum, gum ghatti, and gum arabic, as well as mixtures thereof.

10. The granola bar of claim 7 wherein the binder material is selected from the group consisting of rice flour, wheat flour, oat flour, corn flour, rye flour, and potato flour, as well as mixtures thereof.

11. The granola bar of claim 1 wherein the ratio of the mean particle size of the compressed flakes of supplemental dietary fiber to the mean particle size of the granola ingredients is between about 0.5:1 and about 1:1.

12. The granola bar of claim 1 wherein the compressed flakes of supplemental dietary fiber comprise between about 6 and about 12 percent of the granola bar.

13. A method of making a granola bar with supplemental dietary fiber comprising the steps of:
    forming compressed flakes of supplemental dietary fiber;
    providing a mixture of granola ingredients selected from the group consisting of grains, nuts, and fruits; and
    combining the compressed flakes of supplemental dietary fiber with the mixture of granola ingredients to form a granola bar, wherein the compressed flakes of supplemental dietary fiber have a mean particle size between about 100 and about 5 U.S. mesh in the granola bar and comprise between about 0.5 and about 20 percent of the granola bar.

14. The method of claim 13 wherein the method of forming said compressed flakes of supplemental dietary fiber comprises the steps of:
    combining supplemental dietary fiber with a binder material and water;
    extruding the mixture of supplemental dietary fiber, binder material, and water;
    drying said extruded moisture; and
    particle sizing said dried extruded mixture to produce compressed flakes of supplemental dietary fiber of a desired particle size.

15. The method of claim 14 wherein the mixture of supplemental dietary fiber, binder material, and water is heated.

16. The method of claim 14 wherein the supplemental dietary fiber is selected from the group consisting of apple fiber, corn bran, soy fiber, pectin, guar gum, gum ghatti, and gum arabic, as well as mixtures thereof.

17. The method of claim 14 wherein the binder material is selected from the group consisting of rice flour, wheat flour, oat flour, corn flour, rye flour, and potato flour, as well as mixtures thereof.

18. The method of claim 13 wherein the compressed flakes of supplemental dietary fiber have a mean particle size between about 60 and about 10 U.S. mesh.

19. The method of claim 13 wherein the compressed flakes of supplemental dietary fiber have a mean particle size of about 20 U.S. mesh.

20. The method of claim 13 wherein the ratio of the mean particle size of the compressed flakes of supplemental dietary fiber to the mean particle size of the granola ingredients is between about 0.1:1 to about 2:1.

21. The method of claim 13 wherein the ratio of the mean particle size of the compressed flakes of supplemental dietary fiber to the mean particle size of the granola ingredients is between about 0.5: to about 1:1.

22. A method of making a granola bar with supplemental dietary fiber comprising the steps of:
    combining supplementary dietary fiber with a binder material and water;
    heating and extruding the mixture of supplemental dietary fiber, binder material, and water;
    drying said extruded mixture; and
    particle sizing said dried extruded mixture to produce compressed flakes of supplemental dietary fiber of a desired particle size;
    providing a mixture of granola ingredients selected from the group consisting of grains, nuts, and fruits; and
    combining the compressed flakes of supplemental dietary fiber with the mixture of granola ingredients to form a granola bar, wherein the compressed flakes of supplemental dietary fiber have a mean particle size between about 100 and about 5 U.S. mesh in the granola bar and comprise between about 0.5 and about 20 percent of the granola bar.

* * * * *

UNITED STATES PATENT AND TRADEMARK OFFICE
CERTIFICATE OF CORRECTION

PATENT NO. : 4,871,557

DATED : October 3, 1989

INVENTOR(S) : Susan E. Linscott

It is certified that error appears in the above-identified patent and that said Letters Patent is hereby corrected as shown below:

In column 2, line 42, please delete "state" and substitute therefor --stated,--.

In column 3, line 34, please delete "peak" and substitute therefor --pea--.

In column 4, line 13, please delete "flake" and substitute therefor --flakes--.

In column 4, line 54, please delete "1.0:1" and substitute therefor --0.1:1--.

In column 5, line 67, please delete "granola" and substitute therefor --granular--.

UNITED STATES PATENT AND TRADEMARK OFFICE
CERTIFICATE OF CORRECTION

PATENT NO. : 4,871,557

DATED : October 3, 1989

INVENTOR(S) : Susan E. Linscott

It is certified that error appears in the above-identified patent and that said Letters Patent is hereby corrected as shown below:

In column 6, line 14, please delete "grown" and substitute therefor --brown--.

In column 6, line 48, please delete "brown" and substitute therefor --bowl--.

Signed and Sealed this

Thirtieth Day of June, 1992

*Attest:*

DOUGLAS B. COMER

*Attesting Officer*     *Acting Commissioner of Patents and Trademarks*